US008767248B2

(12) United States Patent
Kurashina

(10) Patent No.: US 8,767,248 B2
(45) Date of Patent: Jul. 1, 2014

(54) LABEL DATA PROCESSING APPARATUS AND LABEL DATA PROCESSING METHOD

(75) Inventor: Hiroyasu Kurashina, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 141 days.

(21) Appl. No.: 13/448,723

(22) Filed: Apr. 17, 2012

(65) Prior Publication Data

US 2012/0268756 A1    Oct. 25, 2012

(30) Foreign Application Priority Data

Apr. 22, 2011  (JP) .................................. 2011-095867

(51) Int. Cl.
*G06K 15/00*   (2006.01)

(52) U.S. Cl.
USPC .......... 358/1.18; 358/1.9; 358/1.15; 400/582; 400/583; 400/611; 400/613

(58) Field of Classification Search
CPC .............. B41J 3/4075; B41J 3/32; B41J 3/46; G06F 17/211; G06F 17/24
See application file for complete search history.

(56) References Cited

U.S. PATENT DOCUMENTS

| | | | | |
|---|---|---|---|---|
| 6,007,262 A | * | 12/1999 | Kurashina | 400/615.2 |
| 7,251,044 B1 | * | 7/2007 | Kurashina | 358/1.11 |
| 7,318,681 B2 | * | 1/2008 | Kato et al. | 400/621 |
| 7,990,567 B2 | * | 8/2011 | Vleurinck et al. | 358/1.18 |
| 8,004,711 B2 | * | 8/2011 | Suzuki et al. | 358/1.16 |
| 8,082,495 B2 | * | 12/2011 | Nose et al. | 715/252 |
| 2003/0218773 A1 | * | 11/2003 | Kurashina | 358/1.16 |
| 2005/0012950 A1 | | 1/2005 | Kurashina | |
| 2006/0022431 A1 | * | 2/2006 | Emig | 280/602 |
| 2007/0231039 A1 | * | 10/2007 | Suzuki et al. | 400/76 |
| 2008/0153072 A1 | * | 6/2008 | Kurashina | 434/114 |
| 2009/0129743 A1 | * | 5/2009 | Joo | 386/68 |
| 2012/0124517 A1 | * | 5/2012 | Landry et al. | 715/810 |
| 2012/0249575 A1 | * | 10/2012 | Krolczyk et al. | 345/619 |

FOREIGN PATENT DOCUMENTS

| | | |
|---|---|---|
| JP | 11-157135 A | 6/1999 |
| JP | 2005-35053 A | 2/2005 |
| JP | 2010-167585 A | 8/2010 |

OTHER PUBLICATIONS

"TEPRA" Pro SR550. User's Manual, First Edition, published in Jul. 2009, pp. 101-103.

* cited by examiner

*Primary Examiner* — Dung Tran
(74) *Attorney, Agent, or Firm* — ALG Intellectual Property, LLC

(57) ABSTRACT

A label data processing apparatus including: a label data storage unit configured to store one or more label data for printing a label; and a display unit configured to switch and display, per label, an editing screen including at least a portion of text data included in each label data, as a selection candidate for the label data.

10 Claims, 12 Drawing Sheets

| FILE NUMBER | LINE NUMBER | TEXT DATA | LABEL TYPE | |
|---|---|---|---|---|
| 1 | 1 | First Line Text | NORMAL LABEL | ⎫ LABEL DATA |
| | 2 | Second Line Text | | |
| | 3 | Third Line Text | | |
| | 4 | Fourth Line Text | | |
| 2 | 1 | Text A | INDEX | |
| | 2 | Text B | | |
| | 3 | Text C | | |
| | 4 | | | |
| 25 | 1 | | NORMAL LABEL | |
| | 2 | | | |
| | 3 | | | |
| | 4 | | | |
| 50 | 1 | Text 1 | NORMAL LABEL | |
| | 2 | Text 2 | | |
| | 3 | Text 3 | | |
| | 4 | Text 4 | | |

FIG. 4

First Line Text
Second Line Text
Third Line Text
Fourth Line Text

LABEL DATA PROCESSING APPARATUS AND LABEL DATA PROCESSING METHOD

CROSS-REFERENCE

The entire disclosure of Japanese Patent Application No. 2011-095867 filed on Apr. 22, 2011, which is hereby incorporated by reference in its entirety.

BACKGROUND

In the related art, a tape printing apparatus capable of registering (saving) text data for a label created by a user, as a file in the apparatus body, is known (see "TEPRA" PRO SR550, User's Manual, First Edition, published in July 2009, pp. 101-103). In this tape printing apparatus, as the user inputs a text on a text screen (editing screen) and then carries out a file menu operation such as pressing a file key, data of the text is registered as a file (file registration function). Also, this tape printing apparatus is capable of registering text data as plural files. The registered file can be called at the time desired by the user, based on the file menu operation (file calling function). When registering and calling a file, the user selects a registration destination and a file to be called on a registered file selecting screen provided separately from the editing screen. On this registered file selecting screen, the file name of each file is displayed as a file selection candidate. Thus, for example, in the case of re-printing a previously created printed matter, the printed matter can be printed simply by calling the file without re-inputting the content of the printed matter.

However, in the tape printing apparatus, for registering and calling a file, the file menu operation must be carried out to display the registered file selecting screen and a desired file must be selected from selection candidates, as described above. That is, there is a problem that since a different menu hierarchical level from editing work needs to be accessed in order to register and call a file, the operation is complicated. There is also a problem that since file selection candidates displayed on the selecting screen are shown by file name, the user cannot confirm the content (text data) of a file at the time of selecting and may select a wrong file. In this case, a wrong file may be overwritten and registered with created text data, or a wrong file may be called, and therefore calling operation must be executed again, which is very inconvenient. Alternatively, a function of confirming the content of a file can be provided. However, in such case, there is a problem that time and effort is required to select the file number of each file, confirm the content thereof, then go back and select another file number in order to actually confirm plural file contents, which is very inefficient and the screen hierarchy and operation become more complicated.

SUMMARY

Various embodiments may provide a label data processing apparatus and a label data processing method, whereby plural label data for printing labels can be easily edited and managed are provided.

According to at least one embodiment of the disclosure, there is provided a label data processing apparatus including a label data storage unit which stores one or more label data for printing a label, and a display unit which switches and displays, per label, an editing screen including at least a portion of text data included in each label data, as a selection candidate for the label data.

According to at least one embodiment of the disclosure, there is provided a label data processing method including storing one or more label data for printing a label, and switching and displaying, per label, an editing screen including at least a portion of text data included in each label data, as a selection candidate for the label data.

According to these configurations, since a selecting screen for registered label data is also the editing screen for the label data, screens for editing and selecting data (for registration and calling) (editing screen and selecting screen) need not be displayed separately. In other words, there is no distinction between menus for editing and selecting data, and the content of label data can be edited directly on a selecting candidate for label data. Thus, moving back and forth between different menus is not necessary and plural label data can be edited and managed by a simple operation.

Also, since the editing screen including text data included in label data is displayed as a selection candidate, the user can properly select label data while confirming the content of data at the time of selecting. It should be understood that "the editing screen including text data" encompasses a blank display where no text is inputted.

Moreover, since the selection candidate is switched and displayed per label, this technique is effective for a small apparatus which cannot provide a large area for the display unit. The phrase "switch and display per label" refers to switching and displaying the editing screen for each label, not for each line, when label data is displayed in plural lines. For example, when the editing screen is switched and displayed by pressing up and down cursor keys, plural lines are collectively switched by one pressing.

In this case, it is preferable that a switch operation unit for switching the display of the editing screen on the display unit per label is provided.

According to this configuration, the selection candidate can be switched at the time desired by the user.

In these cases, it is preferable that the label data storage unit overwrites label data corresponding to the editing screen by storing an editing result on the editing screen before switching the display, triggered by the switching of the display on the display unit.

According to this configuration, no special operation to save (register) label data is necessary. Therefore, loss of editing results of label data due to failure to carry out a saving operation or the like can be eliminated. Also, since there is no need to provide a dedicated key or the like for saving (registering) label data, increase of keys on the apparatus can be restrained.

It is preferable that the label processing apparatus further includes a printing unit which prints an image based on the label data onto a print tape, and that the printing unit handles the label data for which the editing screen is currently displayed on the display unit, as a print target.

According to this configuration, label data displayed as a selection candidate can be printed directly. That is, registered label data can be called and printed easily.

In this case, it is preferable that a print designating unit for designating execution of printing by the printing unit is provided further, and that the label data storage unit overwrites label data corresponding to the editing screen by storing an editing result on the editing screen, triggered by the designation from the print designating unit.

According to this configuration, loss of editing results of label data due to failure to carry out a saving operation or the like can be eliminated. Also, this configuration is convenient when a similar label to an already printed label is to be re-printed.

In the label data processing apparatus, it is preferable that the label data storage unit overwrites label data corresponding to the editing screen by storing an editing result on the editing screen, triggered by a start of power-off processing of the apparatus.

According to this configuration, loss of editing results of label data due to failure to carry out a saving operation or the like can be eliminated. Also, even when power of the apparatus is shut down contrary to the user's intention, edited data can be saved. This operation may be triggered by a start of power-off processing of the apparatus or may be triggered by a designation by the designating unit which designates power-off processing of the apparatus.

In these cases, it is preferable that a difference determining unit which determines whether there is a difference between the label data stored in the label data storage unit and the label data corresponding to the editing result on the editing screen is provided further, and that the label data storage unit performs the overwriting and storing of the label data corresponding to the editing result when the difference determining unit determines that there is a difference.

Also, it is preferable that a processing flag storage unit is provided which stores a processing flag indicating that editing is executed on arbitrary label data, in association with the label data, that the label data storage unit performs the overwriting and storing of the label data when the processing flag is stored in the processing flag storage unit in association with the label data, and that the processing flag storage unit erases the processing flag stored in association with the label data that is stored in the overwriting and storing.

According these configurations, processing to store similar data in overwriting can be omitted when label data stored in the storage unit is the same as label data of an editing result, for example, when selection candidates are switched for browsing label data.

In the label data processing apparatus, it is preferable that the switch operation unit includes a manual operation unit which switches the display on the display unit for each label every time a display switch button is pressed, and an automatic operation unit which switches the display on the display unit continuously in order for each label every predetermined period of time while the display switch button continues being pressed.

According to this configuration, a desired label data can be selected while label data are confirmed one by one using the manual operation unit. Meanwhile, a desired label data can be selected while label data are switched automatically by the automatic operation unit.

In the label data processing unit, it is preferable that the label data includes a data number for specifying each label data, text data representing a print content of the label, and setting data indicating a print setting of the label, and that label data, of the label data, which satisfies a condition that "text data is not included and the setting data indicates predetermined setting" is handled as blank data, and that the display unit displays an editing screen including the data number and the text data, as the selection candidate, and displays the data number in different display forms between when the label data is the blank data and when the label data is not the blank data.

In the label data processing apparatus, it is preferable that the label data includes a data number for specifying each label data, text data representing a print content of the label, and setting data indicating a print setting of the label, and that label data, of the label data, which satisfies a condition that "text data is not included and the setting data indicates predetermined setting" is handled as blank data, and that the display unit displays an editing screen including the data number and the text data, as the selection candidate, and further displays an attribute character indicating that the label data is the blank data when the label data is the blank data.

According to these configurations, when label data is to be newly inputted, blank data to serve as an input destination can be easily found out from selection candidates.

BRIEF DESCRIPTION OF THE DRAWINGS

The invention will be described with reference to the accompanying drawings, wherein like numbers reference like elements.

FIG. 4 illustrates a data configuration stored in a file storage area.

DESCRIPTION OF EXEMPLARY EMBODIMENTS

Figure 1:
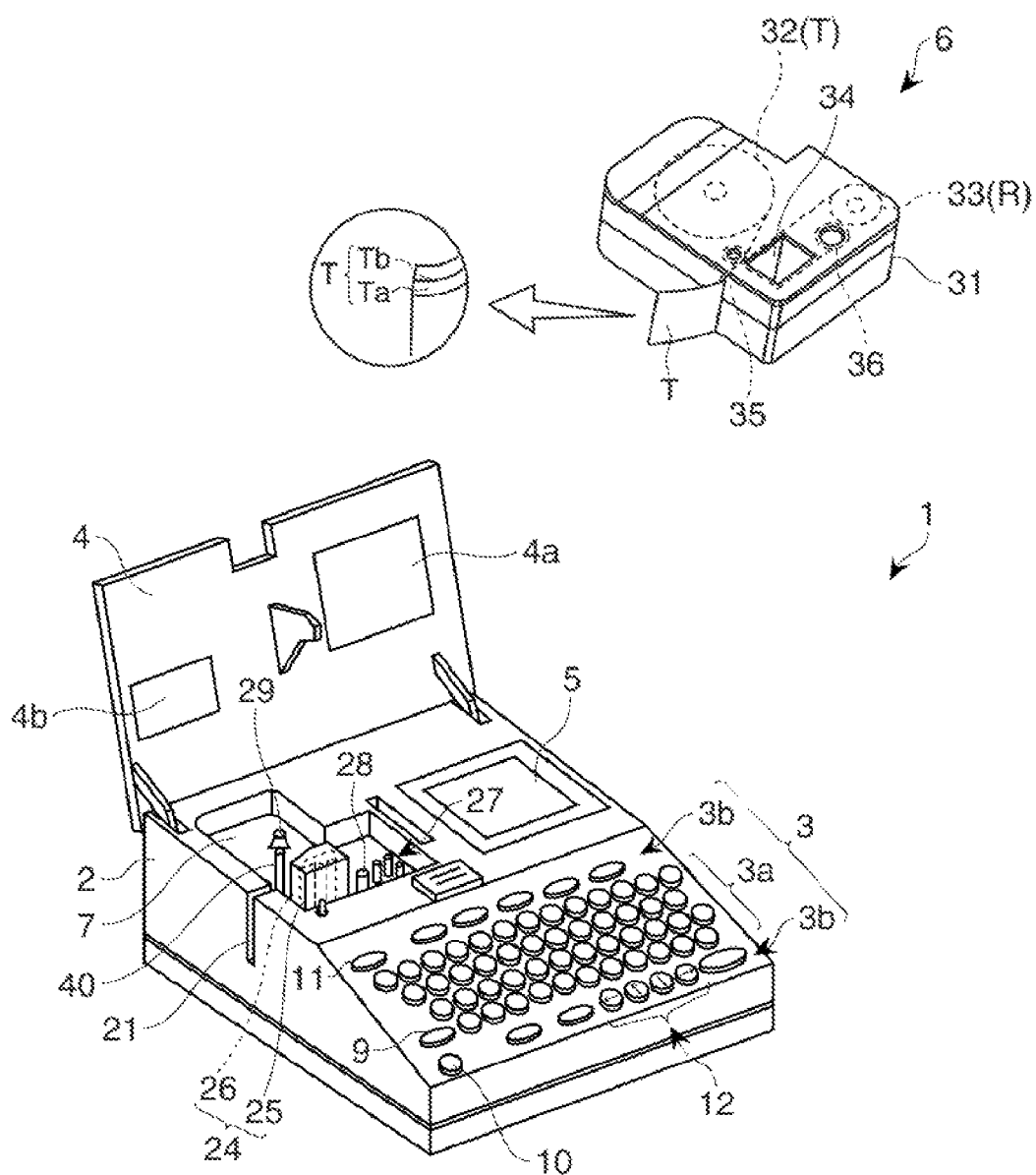
FIG. 1 is a perspective view showing the appearance of a tape printing apparatus according to an embodiment of the invention, with a cover thereof opened.

Hereinafter, an embodiment of the invention will be described in detail with reference to the accompanying drawings. In this embodiment, a label data processing apparatus is applied a tape printing apparatus which prints on a print tape and thus creates a label. FIG. 1 is a perspective view showing the appearance of a tape printing apparatus 1 according to this embodiment, with an open-close cover 4 opened. As illustrated, an apparatus case 2 forms an exterior of the tape printing apparatus 1. A keyboard 3 including various input keys is arranged on a front top side of the apparatus case 2, and the open-close cover 4 is attached to a rear top side. Inside the open-close cover 4, a display 5 (display unit) and a cartridge loading section 7 in a recessed form for loading a tape cartridge 6 therein are formed. The tape cartridge 6 is loaded in and removed from the cartridge loading section 7 in the state where the open-close cover 4 is opened. On the open-close cover 4, a viewing window 4a through which to visually recognize the display 5 in the state where the open-close cover 4 is closed, and a viewing window 4b through which to visually recognize whether the tape cartridge 6 is loaded or not loaded, are formed.

On the keyboard 3, a letter key group 3a, and a function key group 3b for designating various operation modes (menus) or the like are arranged. The letter key group 3a has a full-key configuration based on the JIS arrangement and is similar to the keyboard of a typical word processor or the like, including a [Shift] key 9 for restraining increase in the number of keys to be operated. The function key group 3b includes a power button 10, a [Print] key 11, cursor keys 12 and the like. As in a typical keyboard, an individual key for each of these input keys may be provided, or a smaller number of keys may be used for input by using a combination with the [Shift] key 9 or the like.

The power button 10 is a key for turning on and off the power of the tape printing apparatus 1. The [Print] key 11 (print designating unit) is a key for designating execution of printing. The cursor keys 12 include up, down, left and right keys ([↑], [↓], [←], [→]) for shifting a cursor or for scrolling. According to the invention, by pressing the cursor keys 12 while pressing the [Shift] key 9, an editing screen displayed on the display 5 can be switched per label (switch operation unit). This feature will be described in detail later.

On a left lateral part of the apparatus case 2, a tape discharge port 21 for connecting the cartridge loading section 7 to the outside is formed. In this tape discharge port 21, a tape cutter 22 (see FIG. 3) for cutting a print tape T that is sent out is present. The printed print tape T is sent out from the tape discharge port 21 by a predetermined length. As the printed print tape T is cut by the tape cutter 22 in the state where the sending is paused, a strip-like label is created.

Meanwhile, in the cartridge loading section 7, ahead unit 24 having a thermal-type print head 26 included in a head cover 25, a platen drive shaft 40 facing the print head 26, a take-up drive shaft 28 for taking up an ink ribbon R, which will be described later, and a positioning protrusion 29 of a tape reel 32, which will be described later, are provided. Below the cartridge loading section 7, a tape sending motor 30 (see FIG. 3) which rotates the platen drive shaft 40 and the take-up drive shaft 28 is provided internally.

The tape cartridge 6 houses the tape reel 32 around which the print tape T with a predetermined width (approximately 4 to 48 mm) is wound, at an upper central part within a cartridge case 31, and a ribbon reel 33 around which the ink ribbon R is wound, at a bottom right part. The print tape T and the ink ribbon R have the same width. At a lower left part from the tape reel 32, a through-hole 34 in which to insert the head cover 25 covering the print head 26 is formed. Moreover, on the head unit 24 inserted in the through-hole 34, a platen roller 35 which is fitted with the platen drive shaft 40 and rotationally driven is arranged, corresponding to a portion where the print tape T and the ink ribbon R are superimposed on each other. Meanwhile, a ribbon take-up reel 36 is arranged near the ribbon reel 33, and the ink ribbon R reeled off from the ribbon reel 33 is arranged to circle around the head cover 25 and is taken up by the ribbon take-up reel 36.

As the tape cartridge 6 is loaded in the cartridge loading section 7, the head cover 25 is inserted in the through-hole 34, the positioning protrusion 29 is inserted in a center hole of the tape reel 32, and the take-up drive shaft 28 is inserted in a center hole of the ribbon take-up reel 36. The print head 26 abuts on the platen roller 35 with the print tape T and the ink ribbon R sandwiched between the print head 26 and the platen roll 35. Thus, printing is available. After that, as the user inputs a desired text (letter, number, symbol or character such as a simple graphic pattern) or image via the keyboard 3 while confirming an editing result on the display 5, and then designates printing, the tape printing apparatus 1 reels off the print tape T from the tape cartridge 6 by the tape sending motor 30 and causes heat generating elements of the print head 26 to generate heat selectively, thus performing desired printing on the print tape T. The printed part of the print tape T is sent out from the tape discharge port 21, as needed. When printing is completed, the tape sending motor 30 sends the print tape T up to a position corresponding to a tape length including a margin and then stops the sending (and after that, shifts to cutting processing).

Meanwhile, the print tape T includes a recording tape Ta with an adhesive layer formed on a back side thereof, and a release tape Tb bonded to the recording tape Ta by the adhesive layer. The print tape T is wound in a rolled shape and housed within the cartridge case 31, with the recording tape Ta facing outside and the release tape Tb facing inside. As the print tape T, plural different tape types are prepared (such as tape widths, and ground colors, ground patterns and material qualities (textures) of the tape). In each cartridge case 31, the print tape T of one of these types and the ink ribbon R are housed. On a back side of the cartridge case 31, plural holes (not shown) specifying the type of the tape cartridge 6 are provided. In the cartridge loading section 7, plural tape identification sensors 27 (micro switches or the like) for detecting these plural holes are provided, corresponding to the plural holes. As the tape identification sensors 27 detect the state of the plural holes, the tape type can be determined.

The display 5 is a liquid crystal display and is used when confirming an editing result based on input information inputted by the user using the keyboard 3, and print data or the like generated on the basis of the editing result.

Figure 2:
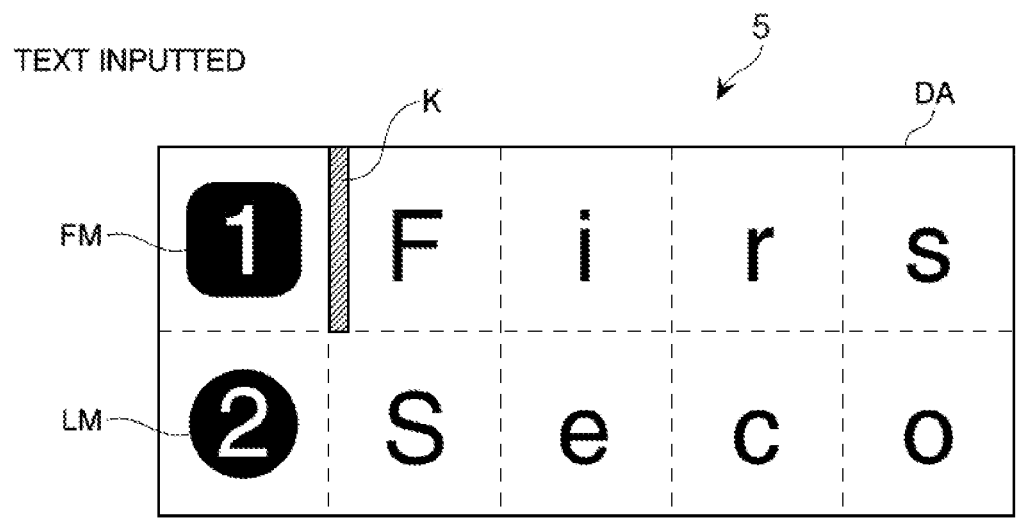
FIG. 2 shows an example of an editing screen displayed on a display.
Figure 2:
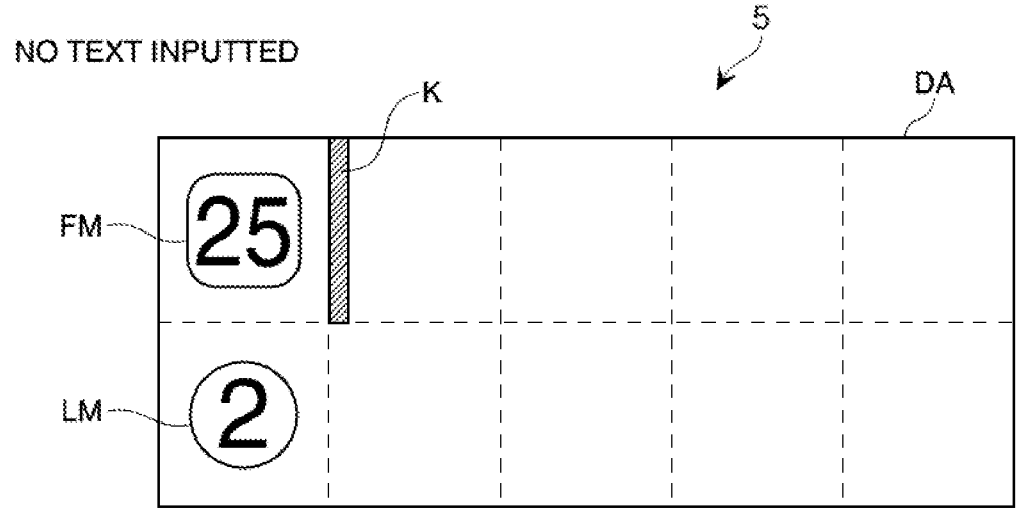

FIG. 2 shows an example of an editing screen displayed on the display 5. As illustrated, the display 5 has a display area DA in which, when displaying an inputted text, one letter (hereinafter, a character (letter, number, symbol, simple graphic pattern or the like) is referred to as a "letter" as a representative thereof) is displayed in a predetermined letter size and five letters (the number of letters per line) by two lines can be displayed within one screen. The symbol FM in FIG. 2 indicates that a letter string of the corresponding line is located in the first line, and also shows a file mark indicating a file number. The symbol LM shows a line head mark (line mark) indicating in which line each letter string is located. The symbol K shows the position of a cursor indicating an editing position. As illustrated, as the file mark FM, a number indicating a file number is displayed in a quadrilateral enclosure. As the line head mark LM, a number indicating a line number is displayed in a round enclosure. That is, in the file mark FM, the quadrilateral enclosure indicates that the letter string of the corresponding line is the first line in the corresponding file.

The upper part of FIG. 2 shows an editing screen in the case where a text is inputted, that is, where text data is stored in a file storage area 85, which will be described later. In this case, the file mark FM and the line head mark LM are displayed in the form of a white number on a black ground. Meanwhile, the lower part of FIG. 2 shows an editing screen in the case where no text is inputted, that is, where text data is not stored in the file storage area 85, which will be described later. In this case, the file mark FM and the line head mark LM are displayed in the form of a black number on a white ground. Thus, the user can grasp whether the displayed label data is blank data or not, with a single glance at the color display of the file mark FM and the line head mark LM. In the lower part of FIG. 2, setting data except for text data is assumed to have similar settings to default setting (which will be described in detail later).

Figure 3:
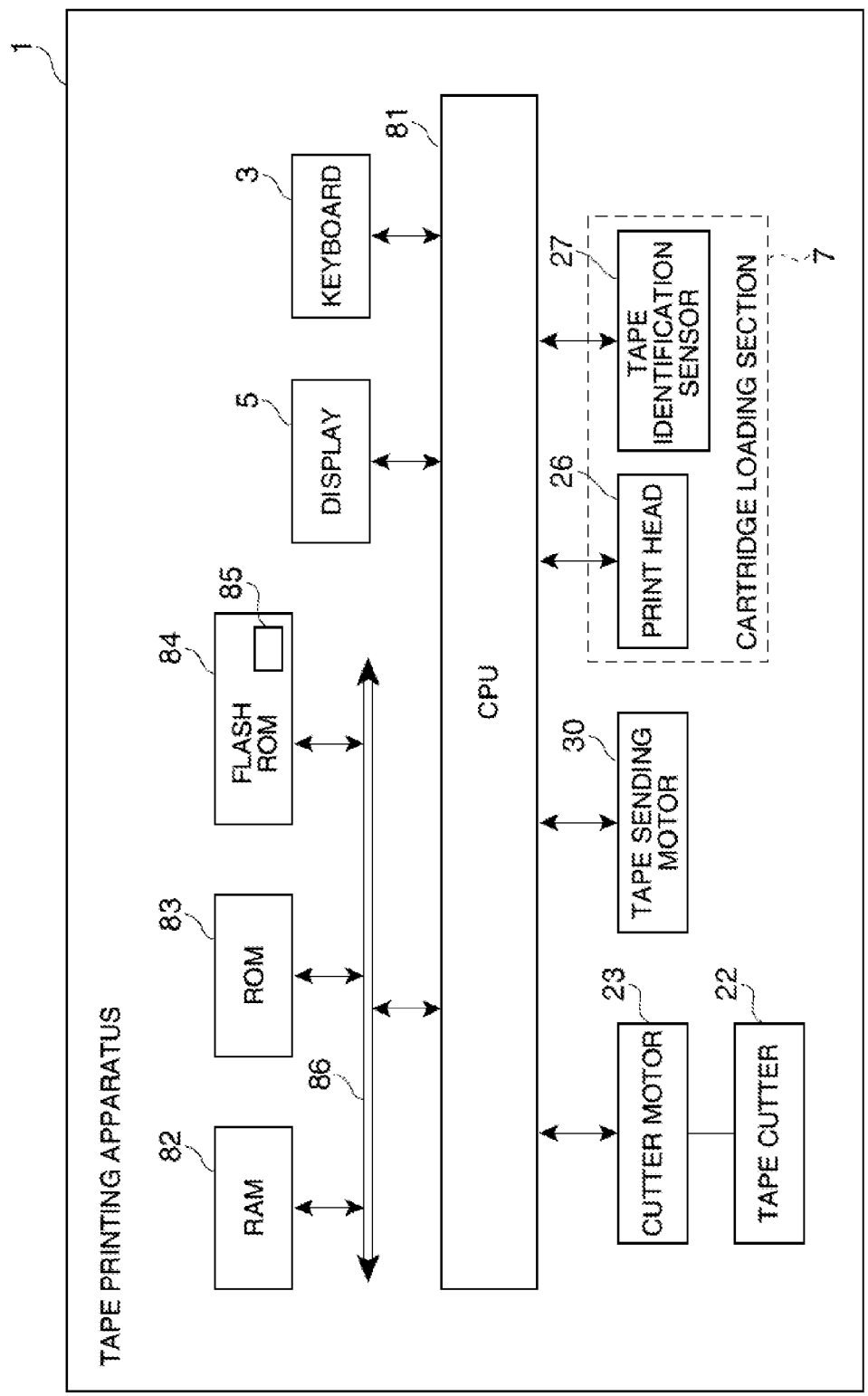
FIG. 3 is a control block diagram of the tape printing apparatus.

Next, referring to the control block diagram of FIG. 3, a control configuration of the tape printing apparatus 1 will be described. The tape printing apparatus 1 includes a CPU (central processing unit) 81, a RAM (random access memory) 82, a ROM (read only memory) 83, a flash ROM 84, the display 5, the keyboard 3, a cutter motor 23, the tape cutter 22, the tape sending motor 30, the print head 26, and the tape identification sensor 27. Of these components, the RAM 82, the ROM 83 and the flash ROM 84 are connected to the CPU 81 via a bus 86. The other components are connected directly to the CPU 81.

The CPU 81 is a central processing unit and performs overall control of each component of the tape printing apparatus 1. The RAM 82 is used as a work area when the CPU 81 performs various controls. The ROM 83 stores a control program and control information for the CPU 81 to perform various controls. As the control program, specifically, programs for printing and cutting processing, file storage processing and display processing on the display are stored (not shown).

The flash ROM 84 has the file storage area 85 (label data storage unit). The file storage area 85 stores data (label data) for printing a label, inputted by the user, as a file per label (see FIG. 4).

The display 5 functions as a display unit for displaying an editing result and a print layout. The keyboard 3 functions as an input unit for the user to input information, as an editing unit for performing editing, as a setting unit for performing various settings, and so on. The cutter motor 23 is connected to the tape cutter 22 and functions as a cutting unit.

The tape sending motor 30 and the print head 26 function as a printing unit which prints on the tape T while carrying the tape T. As described above, the print head 26 and the tape identification sensor 27 are provided in the cartridge loading section 7, and the tape identification sensor 27 detects the type of the tape T housed in the tape cartridge 6. Based on the result of detection by the tape identification sensor 27 (based on the tape material quality, width and the like), the CPU 81 performs limitation of the number of lines and the number of letters that can be inputted as a text, determination about whether the tape can be cut or not, and the like. In response to a print designation, the CPU 81 controls driving of the print head 26, the cutter motor 23 and the tape sending motor 30.

Next, referring to FIG. 4, the data configuration of files stored in the file storage area 85 will be described. In the file storage area 85, up to fifty label data can be stored as files. As illustrated, each label data includes a "file number (data number)" for specifying the label data, a "line number" indicating in which line on the label each letter string of text data is to be arranged, text data inputted by the user, and a "label type" to be created. In this embodiment, text data can be inputted in up to four lines. That is, the tape printing apparatus 1 of this embodiment can create a label on which letter strings of up to four lines are printed, arrayed in direction of the tape width.

The "label type" indicates the form of the label to be created. In this embodiment, for example, the user can select either "normal label" or "index" by a predetermined key operation. When "normal label" is selected, a label on which each letter string of text data is printed, arrayed in the direction of the tape width in order of line numbers, is created (see FIG. 5A). Meanwhile, when "index" is selected, a label on which a margin area 50 with a predetermined width from an edge of the label is provided and on which a similar print result to "normal label" is printed in two sets arrayed in the direction of the tape length, is created (see FIG. 5B). That is, when "index" is selected, the tape printing apparatus 1 generates print data including the margin area 50 and the two sets of text data, and then performs print processing. As the user folds the recording tape Ta after removing the release tape Tb of the label thus created, in such a way that the two sets of text data are placed back to back, and then uses the margin area as an adhesive flap, the label can be used as an index.

In this manner, in this embodiment, label data including a "label type", that is, data indicating print setting (setting data), is stored as a file in the file storage area 85. According to this configuration, print setting can be saved per label. In this embodiment, "normal label" is selected as default setting. The phrase "the setting data indicates predetermined setting" in the appended claims refers to the state where "normal label" is selected as "label type". Label data in which text data is not inputted and "normal label" is selected as "label type", such as label data with a "file number" 25 shown in FIG. 4, is handled as "blank data". Label data in which "index" is selected as "label type" even though text data is not inputted, is handled as label data with input instead of "blank data". Thus, for such label data, the file mark FM and the line head mark LM may be displayed in the form of a white number on a black ground.

Figure 6:
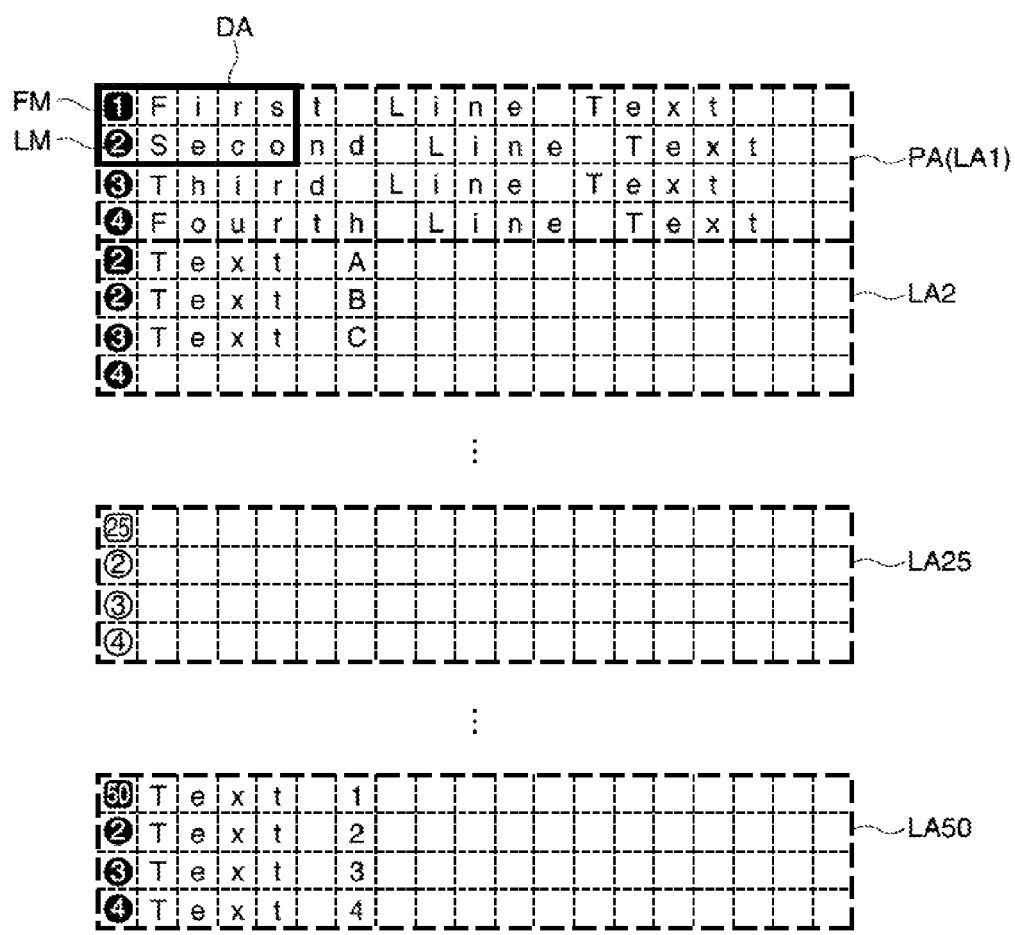
FIG. 6 shows a storage or display image of label data.

FIG. 6 shows a storage or display image in which each character included in each label data stored in the file storage area 85 corresponds to each box in the display area DA on the display 5. That is, this storage or display image shows the data contents held in the file storage area 85 and simultaneously shows the display content shown on the display 5. As illustrated, the file number of label data is shown as a file mark FM which is an attribute character indicating the file number. The line number of each letter string is shown as a line head mark LM which is an attribute character indicating the line number. The display of a line head mark LM indicating the first line is omitted and the file mark FM includes the function of the line head mark LM indicating the first line. Thus, in the display area DA, the displace space for the attribute characters can be curbed. On the right of each mark, each letter string corresponding to text data is shown.

As shown in FIG. 6, the display area DA can move within a processing target area PA showing label data of a processing target label. That is, the processing target area PA is an area in which the display area DA functioning as an editing screen and as a print layout confirmation screen can move, and is an area that is a processing target for editing and printing. In practice, the display area DA moves within the processing target area PA, based on a press signal of the cursor keys 12. The processing target area PA refers to a label data area LA that is a processing target, of label data areas LA1, LA2, . . . , LA50 (together these areas form the entire area of the storage or display image) showing each label data stored as a file. FIG. 6 shows a case where the label data area LA1 with the file number 1 is the processing target area PA.

The processing target area PA can be switched per label. That is, label data that is a processing target can be switched. In practice, the processing target area PA is switched from a label data area LA that is a current processing target to another label data area LA, based on press signals of the [Shift] key 9 and the cursor keys 12 (switch operation unit). The terms "selection candidate" and "editing screen" in the appended claims refer to this processing target area PA.

Figure 7:
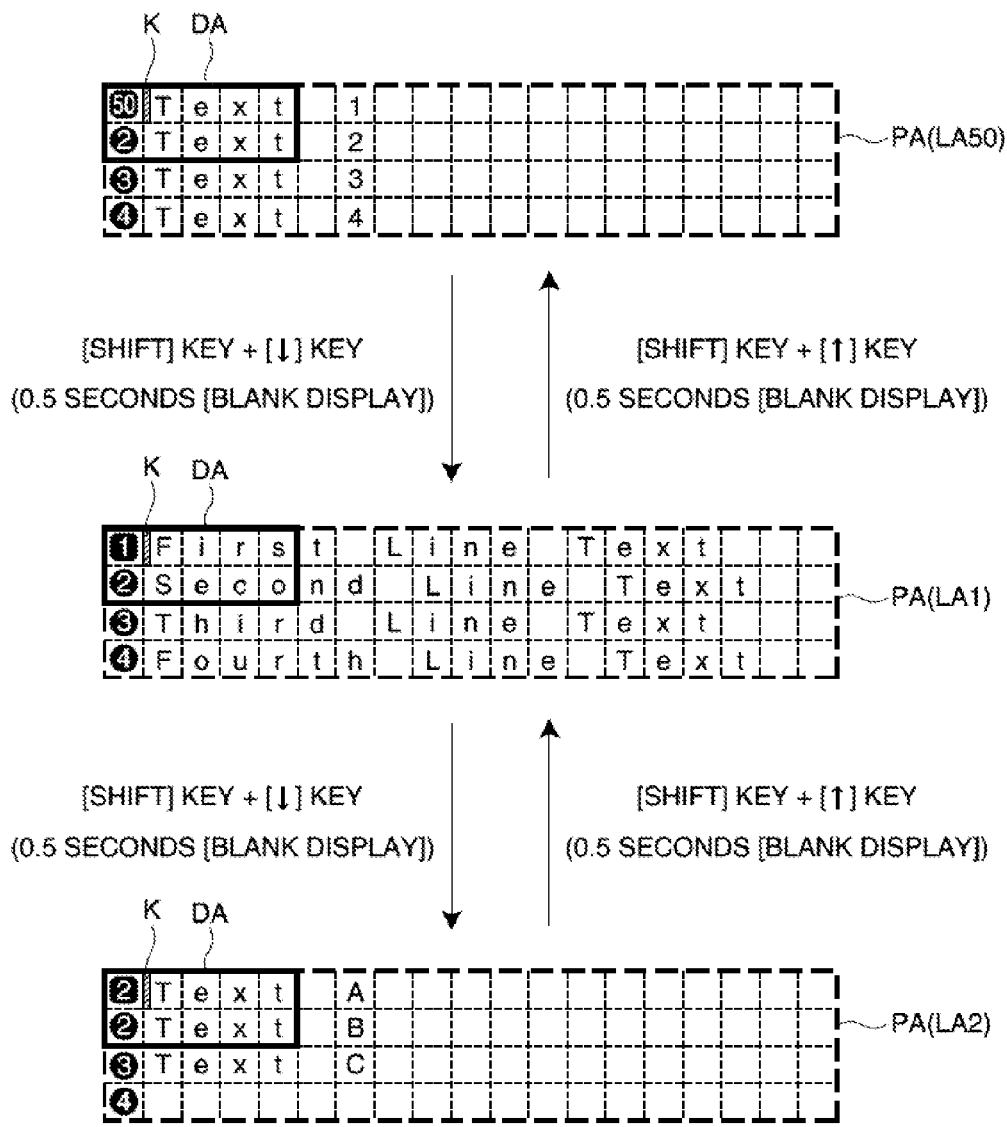
FIG. 7 shows an example of screen transition of the editing screen displayed on the display.

After the processing target area PA is switched, the display area DA is arranged at a position where the file mark FM is displayed in a top left box, and the cursor K indicating the editing position is displayed in the box next to and on the right of the file mark FM (see FIG. 7). Hereinafter, the display state of the display area DA after the processing target area PA is switches is called an "initial state".

Next, referring to FIG. 7 to FIG. 10, screen transition of the editing screen (display area DA) on the display 5 will be described. FIG. 7 shows screen transition when the processing target area PA is switched. In the drawings, all the display areas DA are shown in the initial state.

As shown in FIG. 7, when the [Shift] key 9 and the [↓] key are pressed once in the state where the display area DA is in the label data area LA1, that is, where the processing target area PA is in the label data area LA1, the processing target area PA is switched from the label data area LA1 to the label data area LA2, and the display area DA is displayed in the initial state in the label data area LA2. In this case, the switched screen is displayed after "blank display" in which letter display on the entire screen in the display area DA is erased is performed for 0.5 seconds. Meanwhile, when the [Shift] key 9 and the [↑] key are pressed once in the state where the display area DA is in the label data area LA1, that is, where the processing target area PA is in the label data area LA1, the processing target area PA is switched from the label data area LA1 to the label data area LA50, and the display area DA is displayed in the initial state in the label data area LA50. Again, in this case, the switched screen is displayed after "blank display" in which letter display on the entire screen in the display area DA is erased is performed for 0.5 seconds.

In this manner, the user uses the [Shift] key 9 and the cursor keys 12 to switch processing target label data cyclically. That is, the user uses the [Shift] key 9 and the cursor keys 12 to select desired label data. At this point, since the file mark FM, the line head mark LM and a portion of text data are displayed in the display area DA, the user can properly select label data while confirming the content (text data) of the label data as a label data selection candidate. Also, since the label data displayed in the display area DA is a processing target (print and editing target), the user need not carry out any particular operation to the effect of "finalizing" the selected label data. That is, the very operation of switching label data displayed on the display area DA includes the effect of "finalization". With these configurations, the user need not carryout "registration" and "calling" of label data.

The printing apparatus 1 overwrites the corresponding label data area LA1 by storing the text data in the processing target area PA before the switching, triggered by the pressing of the [Shift] key 9 and the cursor key 12. For example, when the [Shift] key 9 and the [↓] key are pressed in the state where the processing target area PA is the label data area LA1, the label data area LA1 in the file storage area is overwritten by storing the editing result in the processing target area PA (label data area LA1) before the switching. The "blank display" performed after the [Shift] key 9 and the cursor key 12 are pressed indicates that this overwriting and storing processing is being executed. When the overwriting processing takes 0.5 seconds or longer, the "blank display" continues being performed while the overwriting processing is actually being executed. Even when the overwriting processing does not take 0.5 seconds, the "blank display" is performed at least for 0.5 seconds. Thus, the user can be given a sense that overwriting and storing is being carried out.

Figure 8:
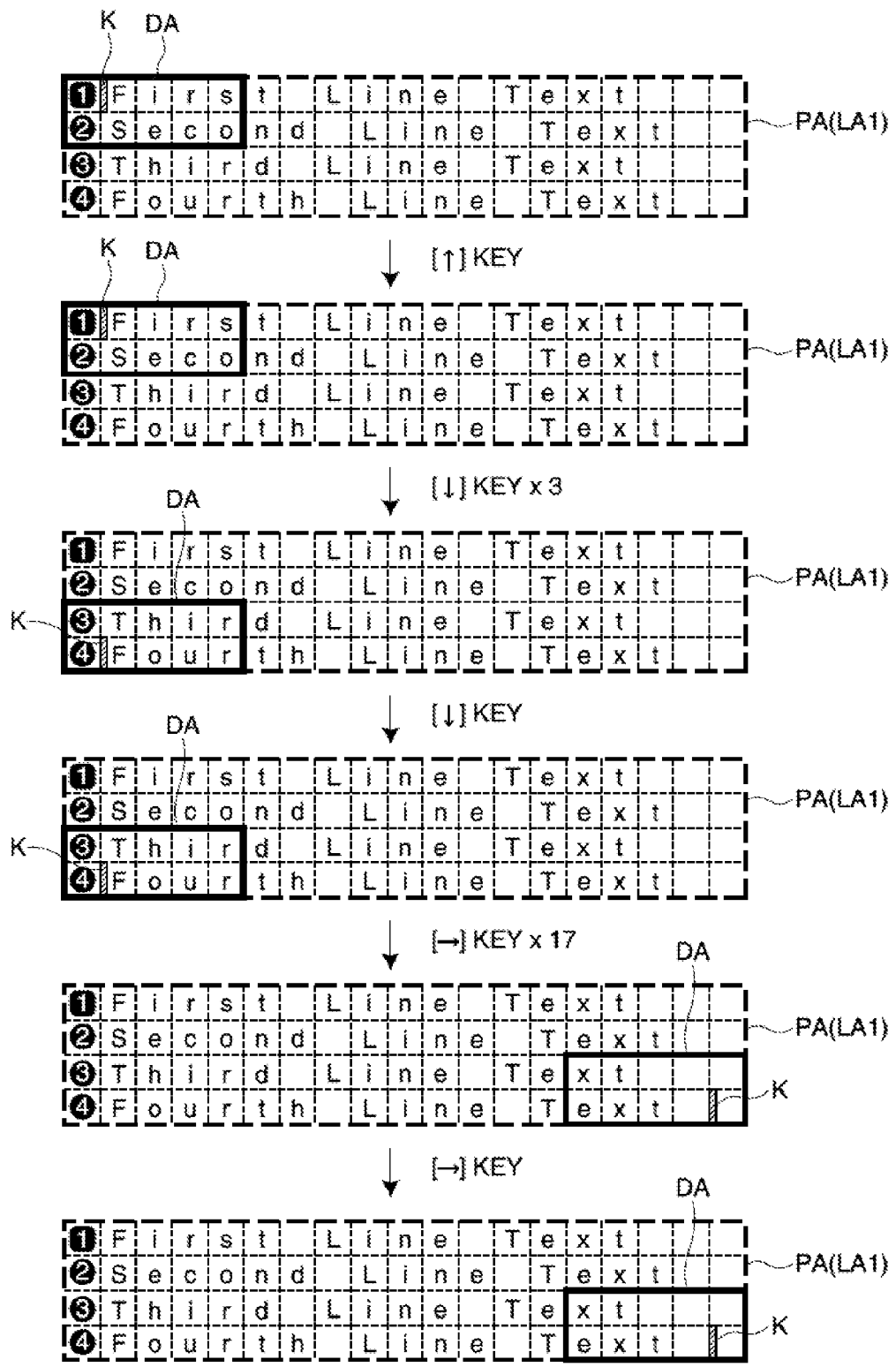
FIG. 8 shows an example of screen transition of the editing screen displayed on the display.

FIG. 8 shows screen transition in the case where the label data of the file number 1 is a processing target and the display area DA moves within the processing target area PA (LA1). As illustrated, after power is turned on (when the previous processing target is the label data of the file number 1) or after the processing target area PA is switched, the file mark FM is displayed in the top left box (default position) in the display area DA, and the cursor K is displayed in the box next to and on the right of the file mark FM (where "F" is shown). In this embodiment, irrespective of whether text data is inputted or not, the display area DA is displayed in the initial state after power is turned on or after the processing target area PA is switched.

When the [↑] key is pressed once in the initial state, the display area DA cannot move out of the processing target area PA (LA1), that is, the display area DA cannot display data outside of the processing target area PA (LA1). Therefore, the display area DA is unchanged and is displayed in the initial state in the label data area LA1.

Meanwhile, when the [↓] key is pressed three consecutive times in the initial state, the display area DA moves to a position where the line head mark LM in the third line is displayed in the top left box, and the cursor K is located in the lead box of the text data in the fourth line (where "F" is shown). As the [↓] key is pressed once more in this state, the display area DA cannot display data outside the processing target area PA (LA1) and therefore the display state thereof does not change.

Moreover, when [→] key is pressed 17 consecutive times in this state, the display area DA moves to a position where the fourteenth letter in the third line (where "x" is shown) is displayed in the top left box, and the cursor K is located in the eighteenth box (blank box) in the fourth line. In this embodiment, up to 18 letters can be inputted (stored) in one line and the eighteenth box is the final box. When the [→] key is pressed once in this state, the display area DA cannot display data outside the processing target area PA (LA1) and therefore the display state thereof does not change.

As the [Shift] key 9 and the [↓] key are pressed in this state, the processing target area PA is switched from the label data area LA1 to the label data area LA2. The display area DA is displayed in the initial state in the label data area LA2.

In this manner, the user carries out an editing work such as input of a new text or deletion of a text, and confirms editing results, while using the cursor keys 12 to move the display area DA within the processing target area PA. In other words, by pressing the cursor keys 12 singly, label data outside the processing target area PA cannot be displayed, and the processing target area PA cannot be switched, either. According to this configuration, since the operation to move the cursor K for an editing work and the operation to switch the processing target area PA to another label (switching selection candidates) are different from each other, erroneous editing and printing of label data that are not desired does not occur.

Figures 5A, 5B:
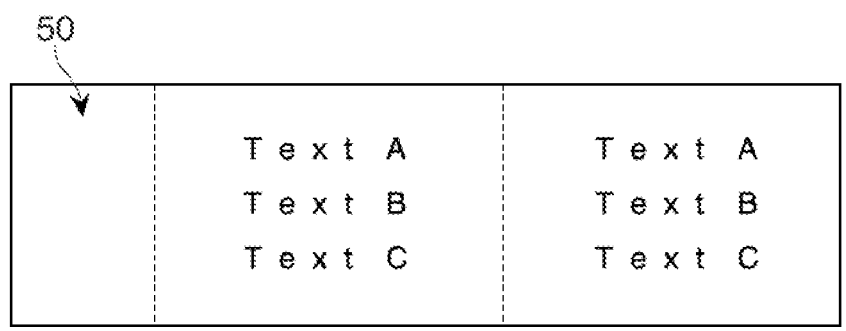
FIG. 5A shows a print result of label data of file number 1.
FIG. 5B shows a print result of label data of file number 2.

Moreover, when the [Print] key 11 is pressed in the case where the processing target area PA is the label data area LA1, that is, where the display area DA is (at any position) in the label data area LA1, print processing is performed based on the label data in the label data area LA1 (see FIG. 5A). When an editing work such as input of a new text or deletion of a text, print processing is performed based on text data immediately before the pressing of the [Print] key 11. Then, the label data area LA1 in the file storage area 85 may be overwritten by storing the edited text data immediately before the pressing of the [Print] key 11, triggered by the pressing of the [Print] key 11.

Meanwhile, for example, when text data is not inputted in label data that is a processing target (for example, when the processing target area PA is the label data area LA25), print processing is not executed even if the [Print] key 11 is pressed. Also, when text data is not inputted and "label type" is changed from default setting "normal label" to "index" (not blank data), print processing is not executed even if the [Print] key 11 is pressed. However, in the case where text data indicating a space is inputted, print processing is executed when the [Print] key 11 is pressed. In this case, a label on which no texts are printed (for example, a plain label) is created.

Figure 9:
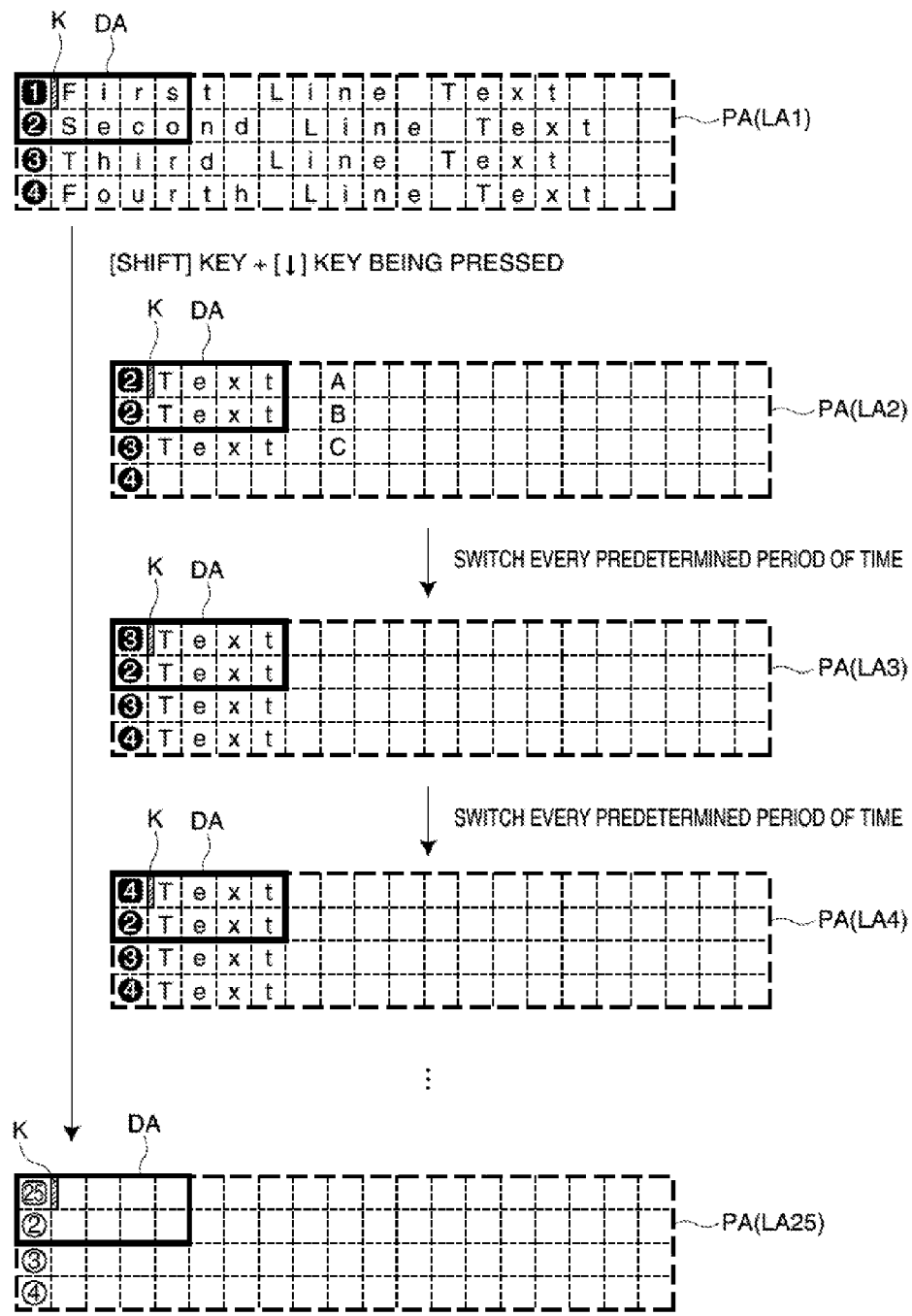
FIG. 9 shows an example of screen transition of the editing screen displayed on the display.

FIG. 9 shows screen transition in the case where the processing target area PA is automatically switched. In the switching of the processing target area PA shown in FIG. 7, the processing target area PA is switched per label every time the [Shift] key 9 and the cursor keys 12 are pressed (manual operation unit). However, by prolonged pressing of the [Shift]

key 9 and the cursor keys 12, the processing target area PA can be automatically switched (auto scroll) (automatic operation unit).

As shown in FIG. 9, when the [Shift] key 9 and the [↓] key continue being pressed for a predetermined period or longer in the state where the display area DA is in the label data area LA1, that is, where the processing target area PA is the label data area LA1, the processing target area PA is automatically switched sequentially from the label data area LA1 to the label data area LA2, the label data area LA3, and the label data area LA4. Then, when the pressing of the [Shift] key 9 and the [↓] key ends, the label data area LA that is the processing target at the time is the processing target area PA, and the display area DA is displayed in the initial state in this label data area LA. FIG. 9 shows the case where the pressing of the [Shift] key 9 and the [↓] key ends when the label data of the file number 25 is the processing target area PA.

During the switching of the processing target area PA, the printing apparatus 1 does not execute overwriting and storing of text data and therefore the "blank display" is not performed. The switching of the processing target area PA during the pressing of the [Shift] key 9 and the [↓] key is executed every predetermined period. That is, the display of selection candidates is switched every predetermined period. According to this configuration, in the case of searching 50 label data for a desired file number, or in the case of searching for blank data, the sequential automatic switching of the processing target area PA enables the desired label data to be found quickly. Particularly in the case of searching for blank data, the displayed file mark FM and line head mark LM are shown in inverted colors to the marks of label data that are not blank data. Therefore, blank data can be easily found (see FIG. 9).

Figure 10:
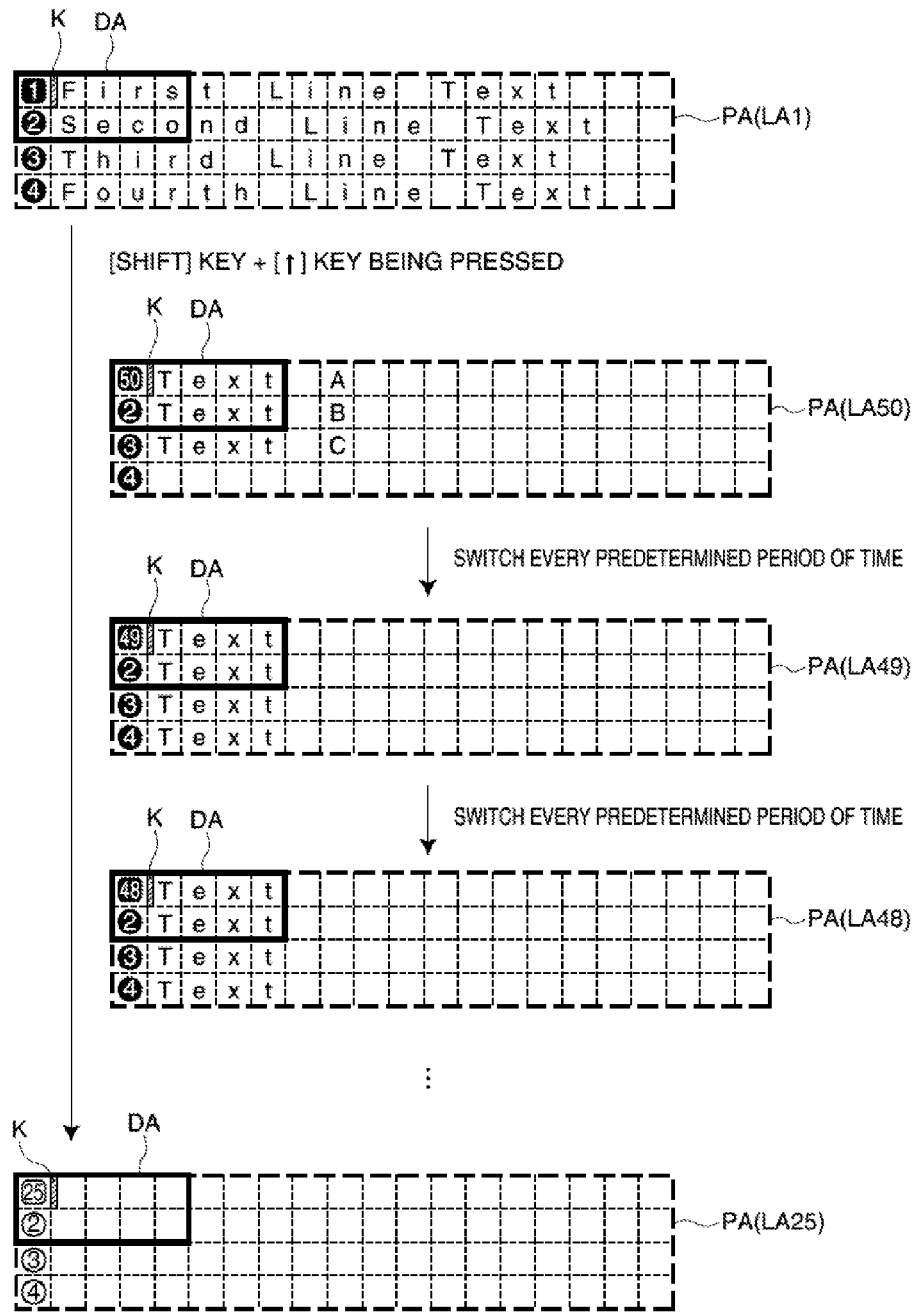
FIG. 10 shows an example of screen transition of the editing screen displayed on the display.

Similarly, as shown in FIG. 10, when the [Shift] key 9 and the [↑] key continue being pressed for a predetermined period or longer in the state where the processing target area PA is the label data area LA1, the processing target area PA is automatically switched sequentially from the label data area LA1 to the label data area LA50, the label data area LA49, and the label data area LA48.

Figure 11:
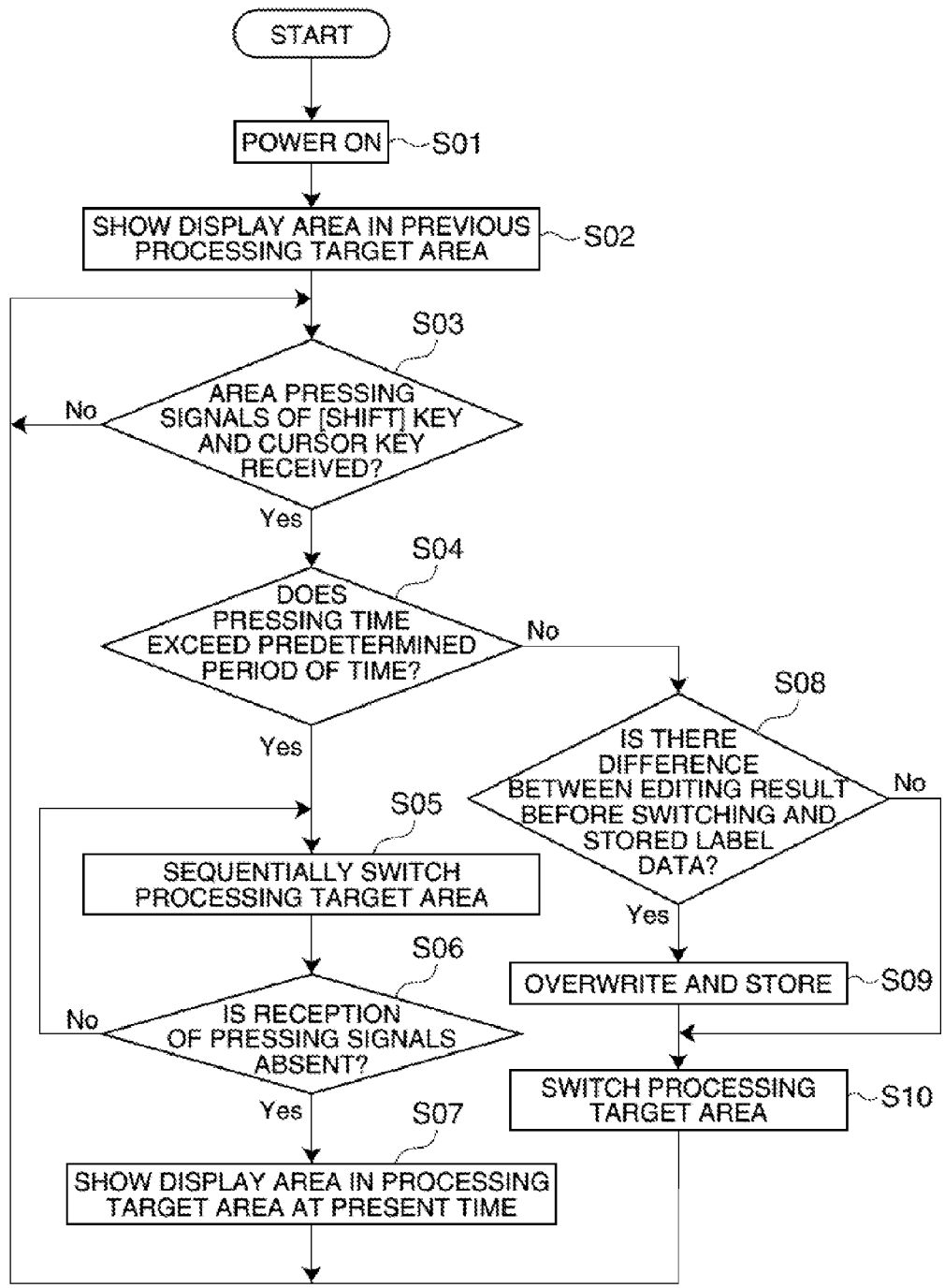
FIG. 11 is a flowchart showing switch processing of a processing target area.

Next, referring to the flowchart of FIG. 11, the switching processing of the processing target area PA in this embodiment will be described. First, when power is turned on in the printing apparatus 1 by pressing the power button 10 (S01), the printing apparatus 1 displays the display area DA in the initial state in the previous processing target area PA (S02). Then, when pressing signals of the [Shift] key 9 and the cursor keys 12 are received (S03: Yes) and the pressing time of these keys exceeds a predetermined period of time (S04: Yes), the processing target area PA is sequentially switched to display the display area DA during the pressing of these keys (S05). Then, as the pressing signals of the [Shift] key 9 and the cursor keys 12 are no longer received (S06: Yes), the display area DA is displayed in the label data area LA that is the processing target at the time (processing target area PA) (S07).

Meanwhile, when the pressing time of these keys does not exceed a predetermined period of time (S04: No), the editing result of the processing target area PA before the switching and the label data stored in the file storage area 85 are compared with each other to determine whether there is a difference between these data (difference determining unit, S08). When it is determined in S08 that there is a difference between the two data (S08: Yes), the label data stored in the file storage area 85 is overwritten by storing the editing result of the processing target area PA before the switching (S09). After that, the processing target area PA is switched to display the display area DA (S10). However, when it is determined in S08 that there is no difference between the two data (S08: No), the processing target area PA is switched to display the display area DA without executing overwriting or storing.

In this manner, since the tape printing apparatus 1 carries out overwriting and storing only when there is a difference between label data that is a target to be stored and label data that is already stored, processing to re-store label data of the same content can be omitted. In this embodiment, the overwriting and storing is executed, triggered by the pressing of the power button 10 in a power-on state (start of power-off processing) or by the pressing of the [Print] key 11.

Also, a processing flag (identifier) indicating that editing is executed on each label data may be set, and whether or not to perform overwriting and storing may be determined based on the processing flag. In this case, the processing flag shows "01" indicating that editing is executed and "00" indicating the editing is not executed. The CPU 81 rewrites the processing flag stored in association with each label data (file) in the RAM 82. Specifically, when editing such as text input or change of setting data for arbitrary label data is executed for the first time after overwriting and storing is executed for this label data, the CPU 81 rewrites the processing flag of the label data to "01". Then, when one of switching of the processing target area PA, print designation and power-off processing is executed, and the processing flag of the processing target label data is "01", the CPU 81 executes overwriting and storing. After the execution of the overwriting and storing, the CPU 81 rewrites the processing flag of the label data to "00". When editing is not carried out, the processing flag is not rewritten and remains "00".

The term "processing flag storage unit" in the appended claims refers to the CPU 81 and the RAM 82. The phrase "erase the processing flag" in the appended claim refers to rewriting the processing flag from "00" to "01".

Figure 12:
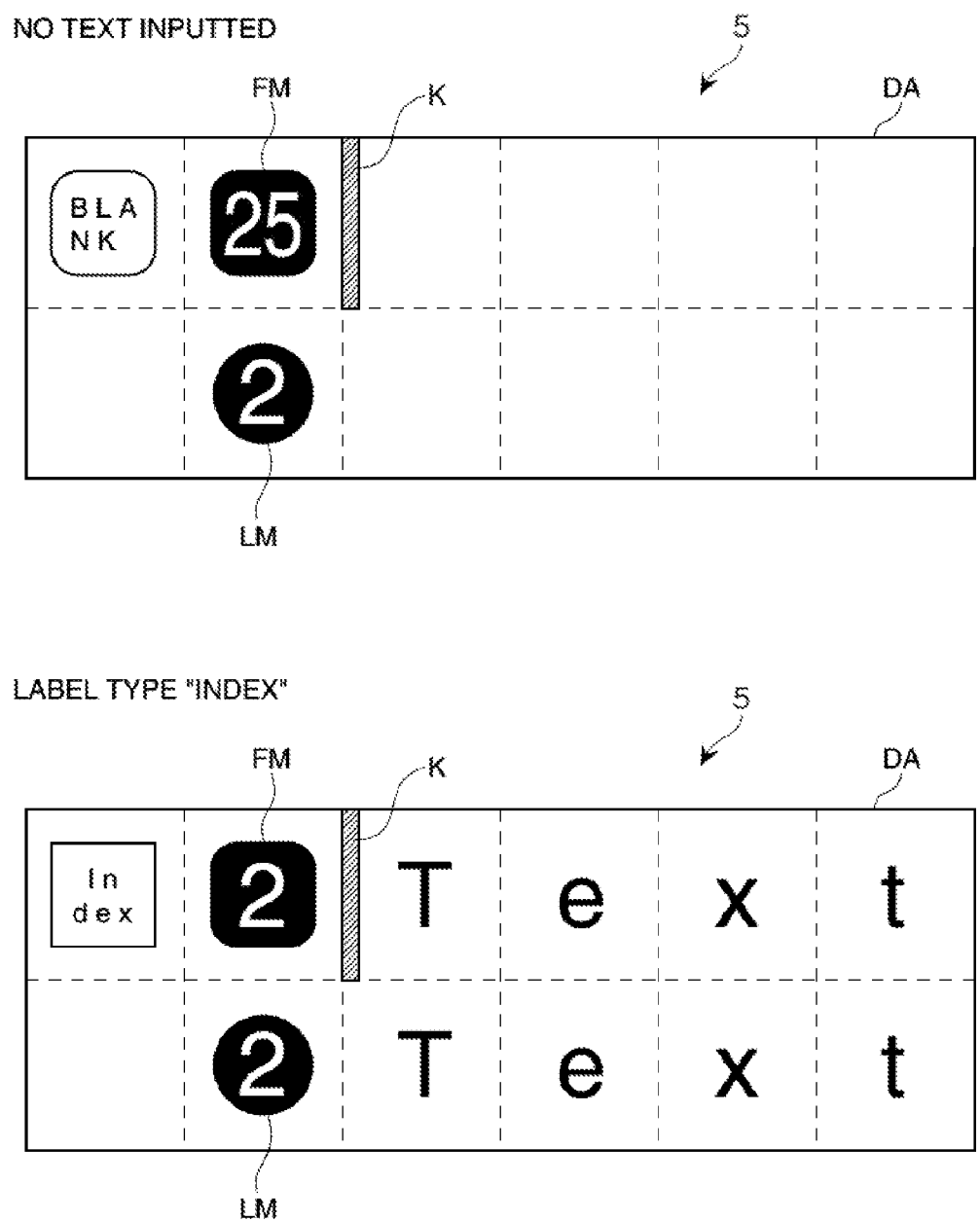
FIG. 12 shows another example of the editing screen displayed on the display.

In the embodiment, the colors of the file mark FM and the line head mark LM are inverted in order to show that label data is blank data. However, as another technique for this, a dedicated attribute character indicating that label data is blank data may be displayed in the display area DA. In this case, as shown in FIG. 12, it is preferable that an area for displaying the attribute character is provided in the box next to and on the left of the file mark FM and the line head mark LM, and that the dedicated attribute character indicating that label data is blank data is displayed in this area.

Also, a dedicated attribute character indicating the label type (in the embodiment, "normal label" and "index") may be displayed in the display area DA. In this case, the dedicated attribute character indicating the label type may be displayed similarly to the attribute character indicating that label data is blank data, for example as shown in FIG. 12.

According to the tape printing apparatus 1 as described above, the editing screen displayed after power is turned on in the apparatus also shows the 50 label data selection candidates stored in the file storage area 85. Therefore, since there is no need to call and register a file each time in order to browse and select saved label data, the operation is easy and convenient. Also, since the content of label data (mainly text data) can be confirmed when selecting label data, desired label data can be selected properly. Moreover, since label data can be directly edited or printed on selection candidates, the operation is easy and convenient.

As the switching of selection candidates (by pressing the [Shift] key 9 and the cursor keys 12), the processing target area PA is switched per label. Therefore, selection candidates per label can be switched easily, even when the display area on the display 5 is small and data contents of all label data cannot be displayed at a time. Also, since the operation to edit label data (singly pressing the cursor keys 12) and the operation to switch selection candidates (pressing the [Shift] key 9 and the cursor keys 12) are different from each other, a wrong operation to switch processing target label data erroneously (switch selection candidates) can be prevented.

The operation to switch the processing target area PA (shift between labels) may be carried out simply by a cursor key operation.

In the embodiment, when the processing target area PA is automatically switched, overwriting and storing of label data is not carried out. However, even when the processing target area PA is automatically switched, overwriting and storing may be carried out every time the display is switched.

In the embodiment, information indicating "label type" is described as an example of setting data included in label data. However, the setting data may include information indicating the typeface of letters of text data, letter space and the like.

In the display area DA, each attribute character (file mark FM, line head mark LM, mark indicating blank data, mark indicating label type) may be displayed in a fixed manner. According to this configuration, even when the display area DA moves in the processing target area PA, the attribute character is displayed constantly. Therefore, the state of the label mark indicated by each attribute character can be presented constantly to the user.

Each component of the tape printing apparatus 1 as described above can also be provided as a program. Also, the program can be stored in a storage medium (not shown) and provided in this form. As the recording medium, a CD-ROM, flash ROM, memory card (compact flash (trademark registered), smart media, memory stick or the like), compact disc, magneto-optical disk, digital versatile disk, flexible disk or the like can be used.

Irrespective of the above examples, the configuration of the tape printing apparatus 1, processing processes and the like can be modified appropriately without departing from the scope of the invention.

What is claimed is:

1. A label data processing apparatus comprising:
    a label data storage unit configured to store one or more label data for printing a label;
    a display unit configured to switch and display, per label, an editing screen including at least a portion of text data included in each label data, as a selection candidate for the label data, and
    a processing flag storage unit which stores a processing flag indicating that editing is executed on arbitrary label data, in association with the label data;
    wherein the label data storage unit overwrites label data corresponding to the editing screen by storing an editing result on the editing screen before switching the display, triggered by the switching of the display on the display unit,
    the label data storage unit performs the overwriting and storing of the label data when the processing flag is stored in the processing storage unit in association with the label data, and
    the processing flag storage unit erases the processing flag stored in association with the label data that is stored in the overwriting and storing.

2. The label data processing apparatus according to claim 1, further comprising a switch operation unit for switching the display of the editing screen on the display unit per label.

3. The label data processing apparatus according to claim 2, wherein the switch operation unit includes a manual operation unit for switching the display on the display unit for each label every time a display switch button is pressed, and an automatic operation unit for switching the display on the display unit continuously in order for each label every predetermined period of time while the display switch button continues being pressed.

4. The label data processing apparatus according to claim 1, further comprising a printing unit for printing an image based on the label data onto a print tape,
    wherein the printing unit handles the label data for which the editing screen is currently displayed on the display unit, as a print target.

5. The label data processing apparatus according to claim 4, further comprising a print designating unit for designating execution of printing by the printing unit,
    wherein the label data storage unit overwrites label data corresponding to the editing screen by storing an editing result on the editing screen, triggered by the designation from the print designating unit.

6. The label data processing apparatus according to claim 1, wherein the label data storage unit overwrites label data corresponding to the editing screen by storing an editing result on the editing screen, triggered by a start of power-off processing of the apparatus.

7. The label data processing apparatus according to claim 1, further comprising a difference determining unit for determining whether there is a difference between the label data stored in the label data storage unit and the label data corresponding to the editing result on the editing screen,
    wherein the label data storage unit performs the overwriting and storing of the label data corresponding to the editing result when the difference determining unit determines that there is a difference.

8. A label data processing apparatus comprising:
    a label data storage unit configured to store one or more label data for printing a label; and
    a display unit configured to switch and display, per label, an editing screen including at least a portion of text data included in each label data, as a selection candidate for the label data,
    wherein the label data includes a data number for specifying each label data, text data representing a print content of the label, and setting data indicating a print setting of the label,
    label data, of the label data, which satisfies a condition that "text data is not included and the setting data indicates predetermined setting" is handled as blank data, and
    the display unit displays an editing screen including the data number and the text data, as the selection candidate, and displays the data number in different display forms between when the label data is the blank data and when the label data is not the blank data.

9. A label data processing apparatus comprising:
    a label data storage unit configured to store one or more label data for printing a label; and
    a display unit configured to switch and display, per label, an editing screen including at least a portion of text data included in each label data, as a selection candidate for the label data,
    wherein the label data includes a data number for specifying each label data, text data representing a print content of the label, and setting data indicating a print setting of the label,
    label data, of the label data, which satisfies a condition that "text data is not included and the setting data indicates predetermined setting" is handled as blank data, and
    the display unit displays an editing screen including the data number and the text data, as the selection candidate, and further displays an attribute character indicating that the label data is the blank data when the label data is the blank data.

10. A label data processing method comprising:

storing one or more label data for printing a label;

switching and displaying, per label, an editing screen including at least a portion of text data included in each label data, as a selection candidate for the label data;

overwriting label data corresponding to the editing screen by storing an editing result on the editing screen before switching the display, triggered by the switching of the display on the display unit;

storing a processing flag indicating that editing is executed on arbitrary label data, in association with the label data;

performing the overwriting and storing of the label data when the processing flag is stored in association with the label data; and erasing the processing flag stored in association with the label data that is stored in the overwriting and storing.

* * * * *